United States Patent
Kidokoro et al.

(10) Patent No.: US 10,029,657 B2
(45) Date of Patent: Jul. 24, 2018

(54) PARKING DEVICE

(71) Applicant: AISIN AW CO., LTD., Anjo-shi, Aichi-ken (JP)

(72) Inventors: Eikichi Kidokoro, Anjo (JP); Takahiro Kokubu, Nishio (JP); Tadamasa Takei, Nagoya (JP)

(73) Assignee: AISIN AW CO., LTD., Anjo-shi, Aichi-ken (JP)

( * ) Notice: Subject to any disclaimer, the term of this patent is extended or adjusted under 35 U.S.C. 154(b) by 159 days.

(21) Appl. No.: 15/026,622

(22) PCT Filed: Dec. 24, 2014

(86) PCT No.: PCT/JP2014/084161
§ 371 (c)(1),
(2) Date: Apr. 1, 2016

(87) PCT Pub. No.: WO2015/098969
PCT Pub. Date: Jul. 2, 2015

(65) Prior Publication Data
US 2016/0244031 A1    Aug. 25, 2016

(30) Foreign Application Priority Data

Dec. 24, 2013 (JP) .................. 2013-265437

(51) Int. Cl.
*B60T 1/00* (2006.01)
*F16D 63/00* (2006.01)
*F16H 63/34* (2006.01)

(52) U.S. Cl.
CPC ............ *B60T 1/005* (2013.01); *F16D 63/006* (2013.01); *F16H 63/3483* (2013.01)

(58) Field of Classification Search
CPC .................. F16H 3/3483; B60T 1/005; F16D 2500/31473
See application file for complete search history.

(56) References Cited

U.S. PATENT DOCUMENTS 6,527,096 B2 * 3/2003 Hoess ..................... B60T 1/005
                                                      188/3 H
9,267,599 B2 * 2/2016 Pollack ............... F16H 63/3433
(Continued)

FOREIGN PATENT DOCUMENTS

JP      52/57477 A    5/1977
JP      7-197685 A    8/1995
(Continued)

OTHER PUBLICATIONS

International Search Report for PCT/JP2014/084161 dated Mar. 10, 2015.

*Primary Examiner* — Stacey A Fluhart
(74) *Attorney, Agent, or Firm* — Sughrue Mion, PLLC (57) ABSTRACT

A device includes a switching valve that performs switching between a first state of supplying a line pressure to an oil chamber defined by a case and a piston and a second state of discharging (draining) hydraulic oil in the oil chamber. The device also includes a drain check valve that closes (prohibits the hydraulic oil in the oil chamber from being discharged) when the line pressure is supplied to the oil chamber, and opens (allows the hydraulic oil in the oil chamber to be discharged) when the line pressure is not supplied to the oil chamber. The hydraulic oil is discharged from the oil chamber through the switching valve and the drain check valve.

12 Claims, 6 Drawing Sheets

(56) References Cited

U.S. PATENT DOCUMENTS

| | | | |
|---|---|---|---|
| 2007/0283735 A1* | 12/2007 | Schweiher | F16H 63/3433 |
| | | | 70/245 |
| 2007/0289823 A1* | 12/2007 | Inagaki | B60T 1/005 |
| | | | 188/72.4 |
| 2011/0023647 A1* | 2/2011 | Engel | F16H 61/30 |
| | | | 74/473.11 |
| 2011/0067962 A1 | 3/2011 | Yonezu et al. | |
| 2011/0198190 A1 | 8/2011 | Steinhauser et al. | |
| 2014/0123799 A1 | 5/2014 | Landino et al. | |
| 2014/0144733 A1* | 5/2014 | Frait | B60T 1/005 |
| | | | 188/106 R |
| 2015/0159752 A1 | 6/2015 | Popp et al. | |

FOREIGN PATENT DOCUMENTS

| | | |
|---|---|---|
| JP | 2008-128444 A | 6/2008 |
| JP | 2011-85256 A | 4/2011 |
| WO | 2013/189655 A1 | 12/2013 |

* cited by examiner

PARKING DEVICE

CROSS REFERENCE TO RELATED APPLICATIONS

This application is a National Stage of International Application No. PCT/JP2014/084161 filed Dec. 24, 2014, claiming priority based on Japanese Patent Application No. 2013-265437 filed Dec. 24, 2013, the contents of all of which are incorporated herein by reference in their entirety.

TECHNICAL FIELD

The present disclosure relates to a parking device, and more in detail, relates to a parking device that is mounted on a vehicle and establishes a parking lock state and a parking lock released state.

BACKGROUND ART

Parking devices of such a type have heretofore been developed, each of which includes a piston, a housing accommodating the piston, and a solenoid valve that moves the piston in the direction of releasing a parking lock against an elastic force of a spring by supplying hydraulic oil from a mechanical pump to a hydraulic oil chamber defined by the piston and the housing (refer to Patent Document 1, for example). To move the piston in the direction of releasing the parking lock and hold the piston in the released state of the parking lock, this parking device supplies the hydraulic oil from the mechanical pump to the hydraulic oil chamber via the solenoid valve. To move the piston in the direction of applying the parking lock, the parking device discharges the hydraulic oil from the hydraulic oil chamber via the solenoid valve.

RELATED-ART DOCUMENTS

Patent Documents

[Patent Document 1] United States Patent Application Publication No. 2011/0198190 (US 2011/0198190 A)

SUMMARY

When the parking device described above discharges the hydraulic oil in the hydraulic oil chamber, the parking device discharges the hydraulic oil from the hydraulic oil chamber via the solenoid valve, so that the time required to discharge the hydraulic oil increases due to pipeline resistance of an oil passage between the solenoid valve and the hydraulic oil chamber and oil flow resistance of the solenoid valve. This increases the time required for the piston to be moved by the elastic force of the spring in the direction of applying the parking lock, and thus increases the time required to apply the parking lock.

In a parking device of the present disclosure, an elastic force moves a movable member toward one side of a first direction and a hydraulic pressure moves the movable member toward the other side of the first direction so as to switch the state of the parking device between the parking lock state and the parking lock released state. It is a primary object of the present disclosure to allow the movable member to more quickly move toward one side of the first direction.

The parking device of the present disclosure employs the following means to achieve the primary object described above.

According to an aspect of the present disclosure, a parking device that is mounted on a vehicle and establishes a parking lock state and a parking lock released state includes:
  a movable member that reciprocates in a first direction so as to be capable of performing switching between the parking lock state and the parking lock released state;
  an elastic member that exerts an elastic force to urge the movable member toward one side of the first direction;
  a housing that accommodates the movable member and forms a hydraulic oil chamber in cooperation with the movable member;
  a switching valve that performs switching between supply of hydraulic oil to the hydraulic oil chamber and discharge of the hydraulic oil from the hydraulic oil chamber; and
  a discharge valve that is separately structured from the switching valve, and that prohibits the hydraulic oil from being discharged from the hydraulic oil chamber when the hydraulic oil is supplied from the switching valve to the hydraulic oil chamber, and allows the hydraulic oil to be discharged from the hydraulic oil chamber when the hydraulic oil is not supplied from the switching valve to the hydraulic oil chamber, and
  the hydraulic oil is discharged from the hydraulic oil chamber through the switching valve and the discharge valve.

The parking device of the present disclosure includes the switching valve that performs the switching between supply of the hydraulic oil to the hydraulic oil chamber and discharge of the hydraulic oil from the hydraulic oil chamber. The parking device also includes the discharge valve that is separately structured from the switching valve, and that prohibits the hydraulic oil from being discharged from the hydraulic oil chamber when the hydraulic oil is supplied from the switching valve to the hydraulic oil chamber, and allows the hydraulic oil to be discharged from the hydraulic oil chamber when the hydraulic oil is not supplied from the switching valve to the hydraulic oil chamber. The hydraulic oil is discharged from the hydraulic oil chamber through the switching valve and the discharge valve. This structure can reduce the time required to discharge the hydraulic oil from the hydraulic oil chamber, and thus can more quickly move the movable member toward one side of the first direction. As a result, the state of parking device can be more quickly switched to a state established on one side of the first direction between the parking lock state and the parking lock released state.

DETAILED DESCRIPTION OF THE PREFERRED EMBODIMENT

Modes for carrying out the present disclosure will be described below using an exemplary embodiment.

Figure 1:
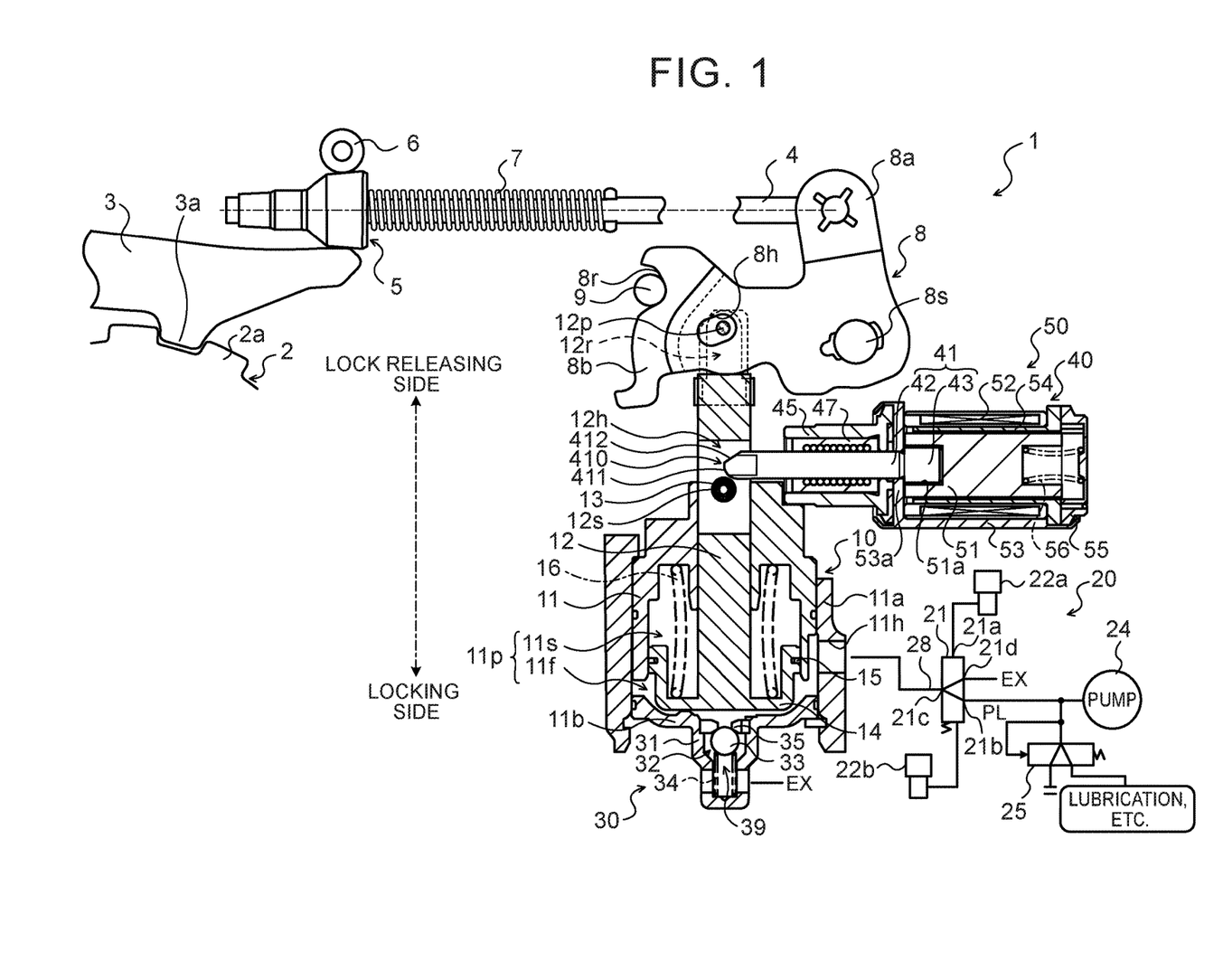
FIG. 1 is a structural diagram showing a schematic structure of a parking device 1 as an exemplary embodiment of the present disclosure.
Figure 2:
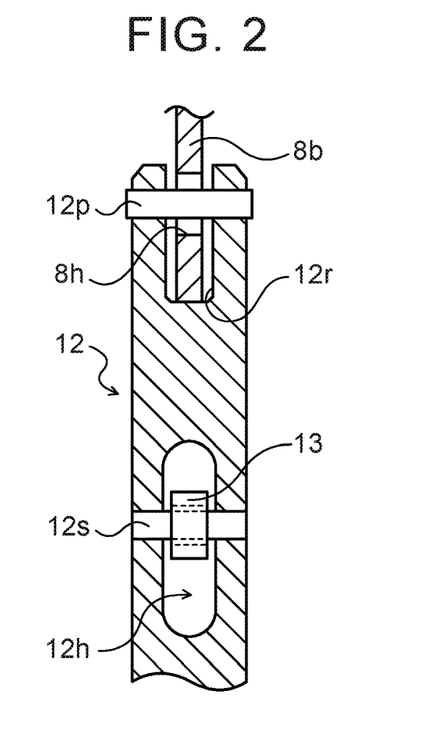
FIG. 2 is a structural diagram showing a schematic structure of a part of a hydraulic actuator 10.
Figure 3:
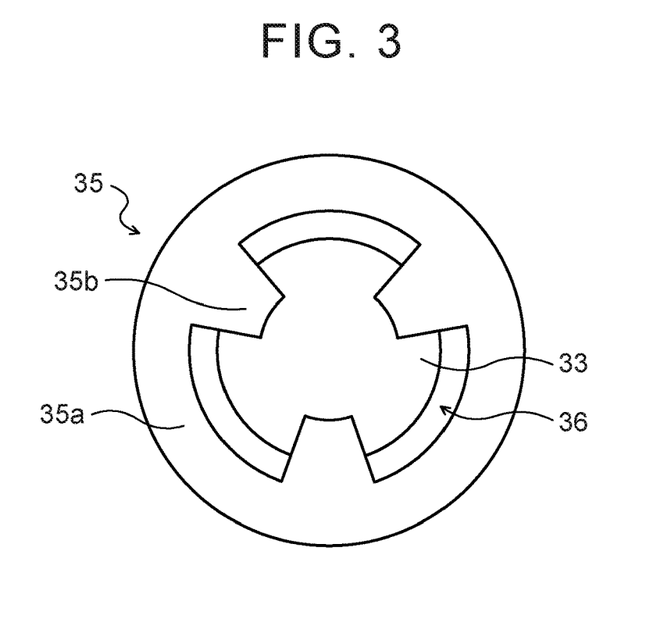
FIG. 3 is a structural diagram of a drain check valve 30 as viewed from the side of an oil chamber 11$f$.

FIG. 1 is a structural diagram showing a schematic structure of a parking device 1 as the embodiment of the present disclosure. FIG. 2 is a structural diagram showing a schematic structure of a part of a hydraulic actuator 10. FIG. 3 is a structural diagram of a drain check valve 30 as viewed from the side of an oil chamber 11f.

The parking device 1 of the embodiment is mounted on a vehicle, and is placed inside or outside a transmission case of a transmission (not shown). The parking device 1 is structured as what is called a shift-by-wire parking device that locks any one of rotational shafts of the transmission (applies a parking lock) and releases the lock of the rotational shaft (releases the parking lock) based on an electrical signal that is output according to an operational position (shift range) of a shift lever (not shown).

As shown in FIG. 1, the parking device 1 includes the following: a parking gear 2 that has a plurality of teeth 2a and is attached to any one of the rotational shafts of the transmission; a parking pawl 3 that has a projecting portion 3a engageable with the parking gear 2 and is urged by a spring (not shown) so as to move away from the parking gear 2; a parking rod 4 that is movable forward and backward; a cylindrical cam member 5 that is movable in the axial direction of the parking rod 4; a supporting roller 6 that is rotatably supported by, for example, the transmission case and pinches the cam member 5 in cooperation with the parking pawl 3; a cam spring 7 that is supported at one end thereof by the parking rod 4 and urges the cam member 5 so as to press the parking pawl 3 to the parking gear 2; a detent lever 8 that is connected to the parking rod 4; the hydraulic actuator 10 that moves the parking rod 4 forward and backward via the detent lever 8 through forward and backward movements (movements in the up and down directions in FIG. 1) of a piston rod 12; and an electromagnetic locking device 40 that restrains the forward and backward movements of the parking rod 4 by restraining the forward and backward movements of the piston rod 12. In the parking device 1, the projecting portion 3a of the parking pawl 3 engages with a recess between adjacent two of the teeth 2a of the parking gear 2 so as to lock the rotational shaft of the transmission (so as to apply the parking lock), as shown in FIG. 1.

Each of the parking gear 2, the parking pawl 3, the parking rod 4, the cam member 5, the supporting roller 6, and the cam spring 7 has a known structure. The detent lever 8 is formed substantially in an L-shape, and has a first free end 8a and a second free end 8b. The first free end 8a is rotatably connected to the proximal end (the right end in FIG. 1) of the parking rod 4. An engagement recess 8r is formed at the second free end 8b, and is engageable with an engagement member 9 attached to a detent spring (not shown) supported by, for example, the transmission case. A corner portion (at proximal ends of the first and second free ends 8a and 8b) of the detent lever 8 is rotatably supported by a spindle 8s that is supported by, for example, the transmission case.

Moving the piston rod 12 of the hydraulic actuator 10 upward in FIG. 1 (hereinafter, expressed as toward a "lock releasing side" where appropriate) rotates the detent lever 8 clockwise in FIG. 1 about the spindle 8s and moves the parking rod 4 rightward in FIG. 1. The movement of the parking rod 4 rightward in FIG. 1 releases the pressure from the cam member 5 onto the parking pawl 3, and releases the engagement between the parking gear 2 and the parking pawl 3 (the locking of the rotational shaft of the transmission) (releases the parking lock).

In contrast, moving the piston rod 12 downward in FIG. 1 (hereinafter, expressed as toward a "locking side") rotates the detent lever 8 counterclockwise in FIG. 1 about the spindle 8s and moves the parking rod 4 leftward in FIG. 1. The movement of the parking rod 4 leftward in FIG. 1 causes the cam member 5 urged by the cam spring 7 to press the parking pawl 3 so as to engage with the parking gear 2, and locks the rotational shaft of the transmission (applies the parking lock). The engagement recess 8r at the second free end 8b of the detent lever 8 engages with the engagement member 9. Thus, the rotation of the detent lever 8 about the spindle 8s is restrained to some extent by the detent spring (not shown), and thereby restraining the movement of the parking rod 4 to some extent.

The hydraulic actuator 10 is structured to be operated by hydraulic pressure from a hydraulic control device 20 of the transmission that is controlled by an electronic control device based on the electrical signal that is output according to the operational position (shift range) of the shift lever. As shown in FIG. 1, the hydraulic actuator 10 includes a case 11 serving as a housing constituted by a plurality of members, the piston rod 12 serving as a movable member that is connected to the second free end 8b of the detent lever 8 and is supported by the case 11 so as to be movable in the axial direction of the piston rod 12 (in the up-down direction in FIG. 1), and a piston 14 that is fixed to the piston rod 12 and is placed in a piston chamber 11p formed in the case 11.

The piston rod 12 is supported by the case 11 such that the distal end (the upper end in FIG. 1) of the piston rod 12 projects outward from the case 11. As shown in FIG. 2, the piston rod 12 has, at the distal end thereof, a connection recess 12r formed to extend from the distal end toward the proximal end of the piston rod 12. The second free end 8b of the detent lever 8 is inserted in the connection recess 12r. An elongated hole 8h is formed in the detent lever 8 so as to be located in the connection recess 12r. A connection pin 12p supported by the distal end of the piston rod 12 is inserted in the elongated hole 8h. The elongated hole 8h is formed such that a space is defined between the inner circumference thereof and an outer circumferential surface of the connection pin 12p. This structure connects the piston rod 12 to the detent lever 8 so as to allow a certain amount of relative movement between each other.

The piston rod 12 has, near the central part in the axial direction thereof, a hole 12h that is formed to pass through the piston rod 12 in a direction orthogonal to the axial direction thereof (in the right-left direction in FIG. 1) and to extend in the axial direction. A roller 13 serving as an abutment target is placed inside the hole 12h. The roller 13 is structured as a roller bearing, and has an outside diameter smaller than a length in the longitudinal direction (in the up-down direction in FIGS. 1 and 2) of the hole 12h. The roller 13 is supported so as to be rotatable in the hole 12h by a supporting shaft 12s that is supported by the piston rod 12 so as to extend in parallel with the connection pin 12p.

The piston 14 is fixed to the proximal end (the lower end in FIG. 1) of the piston rod 12, and is supported by an inner wall surface of the piston chamber 11p via a seal member 15 so as to be movable in the axial direction of the piston rod 12. The piston 14 partitions the inside of the piston chamber 11p into a spring chamber 11s and an oil chamber 11f. The spring chamber 11s is defined in an upper portion in FIG. 1 of the piston chamber 11p so as to be closer to the distal end of the piston rod 12 and the detent lever 8. A return spring 16 serving as an elastic member is placed in the spring chamber 11s so as to be located between the case 11 and the piston 14. The return spring 16 urges the piston 14 toward the locking side (downward in FIG. 1). The oil chamber 11f is defined in a lower portion in FIG. 1 of the piston chamber 11p so as to be away from the distal end (the upper end in FIG. 1) of the piston rod 12 and the detent lever 8. A hydraulic pressure supplied to the oil chamber 11f moves the piston rod 12 and the piston 14 toward the lock releasing side (upward in FIG. 1) against an urging force of the return spring 16. The oil chamber 11f communicates with the hydraulic control device 20 through an oil hole 11h formed in a portion (hereinafter, called a side wall) 11a on the right side in FIG. 1 of the piston 14 in the case 11. The drain check valve 30 is provided at a portion (hereinafter, called a bottom) 11b on the lower side in FIG. 1 of the piston 14 in the case 11. Opening the drain check valve 30 can discharge hydraulic oil in the oil chamber 11f from a discharge port 39 through the drain check valve 30.

The hydraulic control device 20 includes, for example, a primary regulator valve 25 that is connected to an oil pump 24 operated by power from an engine and generates a line pressure PL by regulating the pressure of hydraulic oil from a valve body and the oil pump 24, a modulator valve that generates a substantially constant modulator pressure Pmod by regulating the line pressure PL, a switching valve 21 that performs switching between a first state of supplying the line pressure PL to the oil chamber 11f through an oil passage 28 and the oil hole 11h and a second state of discharging (draining) the hydraulic oil from the oil chamber 11f and the oil passage 28, and on/off solenoid valves 22a and 22b that drive the switching valve 21.

The on/off solenoid valves 22a and 22b are structured to be capable of outputting, for example, the line pressure PL, the modulator pressure Pmod, and the like as signal pressures to the switching valve 21. The switching valve 21 is structured as a spool valve that includes the following: signal pressure input ports 21a for receiving the signal pressures from the on/off solenoid valves 22a and 22b; an input port 21b for receiving the line pressure PL; an output port 21c communicating with the oil passage 28; a sleeve in which various ports such as a drain port 21d are formed; a spool that slides in the sleeve in the axial direction thereof; and a spring that urges the spool toward one side in the axial direction thereof. When at least one of the on/off solenoid valves 22a and 22b supplies a signal pressure to corresponding one of the signal pressure input ports 21a, the spool moves toward the other side in the axial direction thereof against the urging force of the spring, and thereby providing communication between the input port 21b and the output port 21c and blocking communication between the input port 21b and the drain port 21d. Thus, the switching valve 21 establishes the first state. When neither of the on/off solenoid valves 22a and 22b supplies a signal pressure to corresponding one of the signal pressure input ports 21a, the urging force of the spring urges the spool toward one side in the axial direction thereof, and thereby communicating the output port 21c with the drain port 21d and blocking communication between the input port 21b and the output port 21c. Thus, the switching valve 21 establishes the second state.

The drain check valve 30 includes an accommodating portion 31 having an accommodating space 32 communicating with the oil chamber 11f and the discharge port 39, a ball 33 that is placed in the accommodating space 32 and serves as a valve element capable of shielding the discharge port 39 with the hydraulic pressure of the oil chamber 11f, a spring 34 serving as an urging member for urging the ball 33 toward the oil chamber 11f side (upward in FIG. 1), and a receiving part 35 that is attached on the inner circumference of the accommodating portion 31 near the boundary with the case 11 and to which the ball 33 urged by the spring 34 is pressed.

The accommodating portion 31 is integrally formed with the bottom 11b of the case 11 so as to project downward in FIG. 1 from the bottom 11b. As shown in FIG. 3, the receiving part 35 includes a first inside diameter portion 35a having an inside diameter larger than the outside diameter of the ball 33 and a second inside diameter portion (claw portion) 35b having an inside diameter smaller than the outside diameter of the ball 33, the first and second inside diameter portions 35a and 35b being formed so as to alternate with each other in the circumferential direction. The discharge port 39 is formed to have a diameter smaller than the outside diameter of the ball 33. The accommodating portion 31 is integrally formed with the bottom 11b of the case 11, so that the distance between the oil chamber 11f and the discharge port 39 is smaller than the length of the oil passage 28 (such as several tens of centimeters) between the oil chamber 11f and the switching valve 21.

In the drain check valve 30, when the hydraulic pressure of the oil chamber 11f is high (when the line pressure PL is supplied from the switching valve 21 to the oil chamber 11f), the hydraulic pressure closes the discharge port 39 by pressing the ball 33 to the discharge port 39 while contracting the spring 34. In other words, the drain check valve 30 closes. In contrast, when the hydraulic pressure of the oil chamber 11f is low (when the line pressure PL is not supplied from the switching valve 21 to the oil chamber 11f), the urging force of the spring 34 urges the ball 33 toward the oil chamber 11f to press the ball 33 to the second inside diameter portion 35b of the receiving part 35. Even at this time, a gap 36 is formed between the ball 33 and the inner circumference of the first inside diameter portion 35a of the receiving part 35, so that the hydraulic oil in the oil chamber 11f is discharged from the discharge port 39 through the gap 36 and the accommodating space 32. In other words, the drain check valve 30 opens. In this manner, by structuring the drain check valve 30 to open and close depending on whether the line pressure PL is supplied to the oil chamber 11f, no necessity arises to provide a drive circuit (on/off solenoid valve) or the like for driving the drain check valve 30. In the embodiment, the drain check valve 30 is structured so as to be closed with the spring 34 contracting when the hydraulic pressure of the oil chamber 11f is equal to or higher than a predetermined pressure Pref that is equal to or lower than a lower limit value of the line pressure PL, and so as to be opened with the spring 34 extending when the hydraulic pressure of the oil chamber 11f is lower than the predetermined pressure Pref. Consequently, when the line pressure PL is supplied from the switching valve 21 to the oil chamber 11f, the check valve 30 closes, and the hydraulic oil can thus be inhibited from leaking (from being discharged from the discharge port 39). Specifically, the predetermined pressure Pref is set such that the drain check valve 30 opens when a force (valve opening force) determined by the sealing area of the discharge port 39 provided by the ball 33 and the urging force of the spring 34 is larger than a force (valve closing force) determined by the cross-sectional area of the piston 14 and the urging force of the return spring 16. In other words, specifications of respective components of the drain check valve 30, such as the spring constant of the spring 34, are designed such that the predetermined pressure Pref is set in the above-described manner.

As shown in FIG. 1, the electromagnetic locking device 40 includes a lock shaft 41 that includes an abutting portion 410 capable of abutting on the roller 13 serving as an abutment target provided in the piston rod 12 and that is movable in a direction (the right-left direction in FIG. 1 (a second direction)) orthogonal to the forward/backward moving direction of the piston rod 12 (the up-down direction in FIG. 1 (a first direction)), a shaft holder 45 that supports the lock shaft 41 via a linear-motion bearing 47 such that the lock shaft 41 is movable in the axial direction thereof (in the right-left direction in FIG. 1), and a solenoid unit 50 that can lock the lock shaft 41 with a magnetic force.

The lock shaft 41 is formed of a nonmagnetic material, such as stainless steel, and includes a small diameter portion 42 including the abutting portion 410 at one end (distal end) thereof and a large diameter portion 43 that extends from the small diameter portion 42 toward a side opposite to the abutting portion 410 and that has a diameter larger than that of the small diameter portion 42. The small diameter portion 42 is formed substantially in a cylindrical shape, and the abutting portion 410 provided at the distal end thereof is formed so as to have a shape with two parallel flat planes. The abutting portion 410 is located in the hole 12h of the piston rod 12, and overlaps at least a part of the outer circumferential surface of the roller 13 when viewed from the axial direction of the piston rod 12 (the up-down direction in FIG. 1). The large diameter portion 43 is formed substantially in a cylindrical shape.

The abutting portion 410 of the small diameter portion 42 includes a first abutting surface 411 located on the locking side (on the lower side in FIG. 1) in the moving direction of the piston rod 12 (in the up-down direction in FIG. 1) and a second abutting surface 412 located on the lock releasing side (on the upper side in FIG. 1) in the moving direction of the piston rod 12. The first abutting surface 411 is formed in a sloped shape approaching the locking side as the position thereof shifts from the abutting portion 410 side toward the large diameter portion 43, and is specifically formed as a curved surface with a circular arc-like section that has a radius of curvature smaller than the radius (radius of curvature) of the outer circumferential surface of the roller 13 and that is convex toward the locking side. The second abutting surface 412 is formed in a sloped shape approaching the lock releasing side as the position thereof shifts from the abutting portion 410 side toward the large diameter portion 43, and is specifically formed as a (flat) sloped surface sloped at a constant angle toward the lock releasing side.

The solenoid unit 50 includes the following: a plunger 51 movable in the axial direction thereof (in the right-left direction in FIG. 1); a coil 52 placed so as to surround the outer circumference of the plunger 51; a yoke 53 that holds the shaft holder 45 and functions as a case for accommodating the plunger 51 and the coil 52; a core 54 placed between the plunger 51 and the coil 52; a rear cap 55 attached at the right end in FIG. 1 of the yoke 53 so as to hold the coil 52 and the core 54; and a spring 56 serving as an elastic member that is placed between the plunger 51 and the rear cap 55, and urges the plunger 51 toward the piston rod 12 (leftward in FIG. 1).

The plunger 51 is formed of a magnetic material, such as iron, and a recess 51a is formed on one end side in the axial direction (on the left end side in FIG. 1) of the plunger 51. The large diameter portion 43 of the lock shaft 41 is inserted in the recess 51a. The coil 52 includes a terminal connected to a connector (not shown) attached to the yoke 53 serving as a case. The coil 52 is supplied with a current from an auxiliary battery of a vehicle (not shown) via a power supply circuit controlled by the electronic control device for controlling the hydraulic control device 20 or by another electronic control device, and via the connector. The yoke 53 is formed of a magnetic material, such as iron, and includes a flange 53a projecting inward in the radial direction on one end side (on the left end side in FIG. 1) of the yoke 53. The flange 53a has an inside diameter allowing the small diameter portion 42 of the lock shaft 41 to slide, and faces the large diameter portion 43 of the lock shaft 41 and the plunger 51 in the right-left direction in FIG. 1. The spring 56 has a spring constant (stiffness) smaller than that of the return spring 16 of the hydraulic actuator 10, and urges the lock shaft 41 and the plunger 51 that are not fixed to each other toward the piston rod 12 (leftward in FIG. 1). When an external force larger than the urging force (elastic force) of the spring 56 is applied to the lock shaft 41 toward the rear cap 55 (rightward in FIG. 1), the spring 56 allows the lock shaft 41 and the plunger 51 to move toward the rear cap 55.

When the coil 52 in the electromagnetic locking device 40 is energized, a magnetic flux passing through the yoke 53, the plunger 51, and the core 54 attracts the plunger 51 toward the flange 53a of the yoke 53. At this time, the lock shaft 41 and the plunger 51 are restrained from moving toward the rear cap 55 (rightward in FIG. 1) regardless of whether a force is applied from the piston rod 12 (roller 13) to the abutting portion 410 of the lock shaft 41.

The following describes operations of the parking device 1 of the embodiment structured in the above-described manner.

First, the following describes an operation when the piston rod 12 is hydraulically moved upward in FIG. 1 to perform switching from a parking lock state shown in FIG. 1 to a parking lock released state. In the parking lock state, the line pressure PL is not supplied from the switching valve 21 of the hydraulic control device 20 to the oil chamber 11f of the hydraulic actuator 10, and the coil 52 of the electromagnetic locking device 40 is not energized. As a result, the piston 14 of the hydraulic actuator 10 is urged downward in FIG. 1 by the return spring 16 so as to be closest to or in contact with the bottom 11b of the case 11. The ball 33 is urged toward the oil chamber 11f by the urging force of the spring 34 to be pressed to the receiving part 35 (not to block the discharge port 39), so that the drain check valve 30 is open. In the embodiment, at this time, a first predetermined gap is formed between the roller 13 and the first abutting surface 411 of the lock shaft 41.

Figure 4:
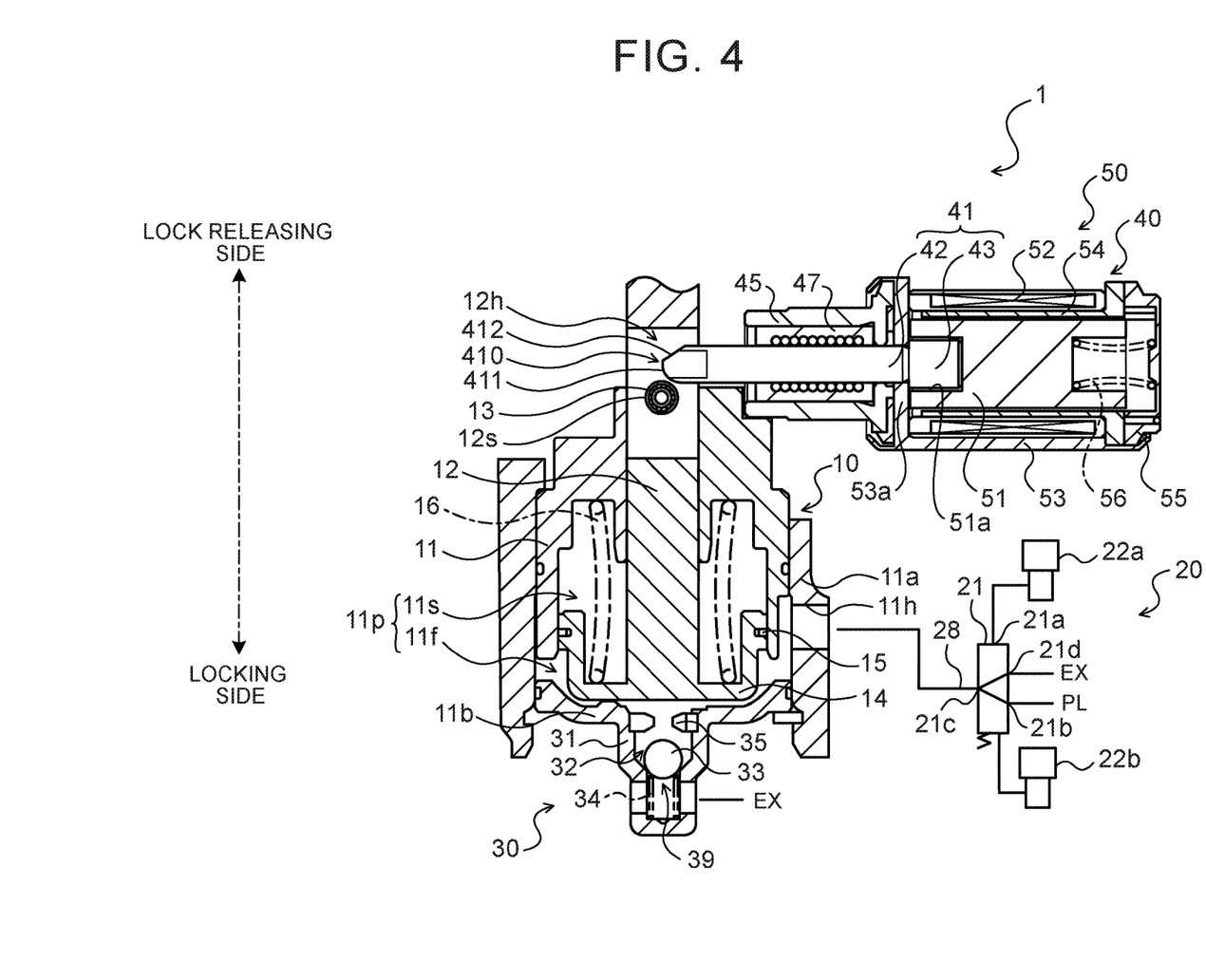
FIG. 4 is an explanatory diagram for explaining an operation of the parking device 1.
Figure 5:
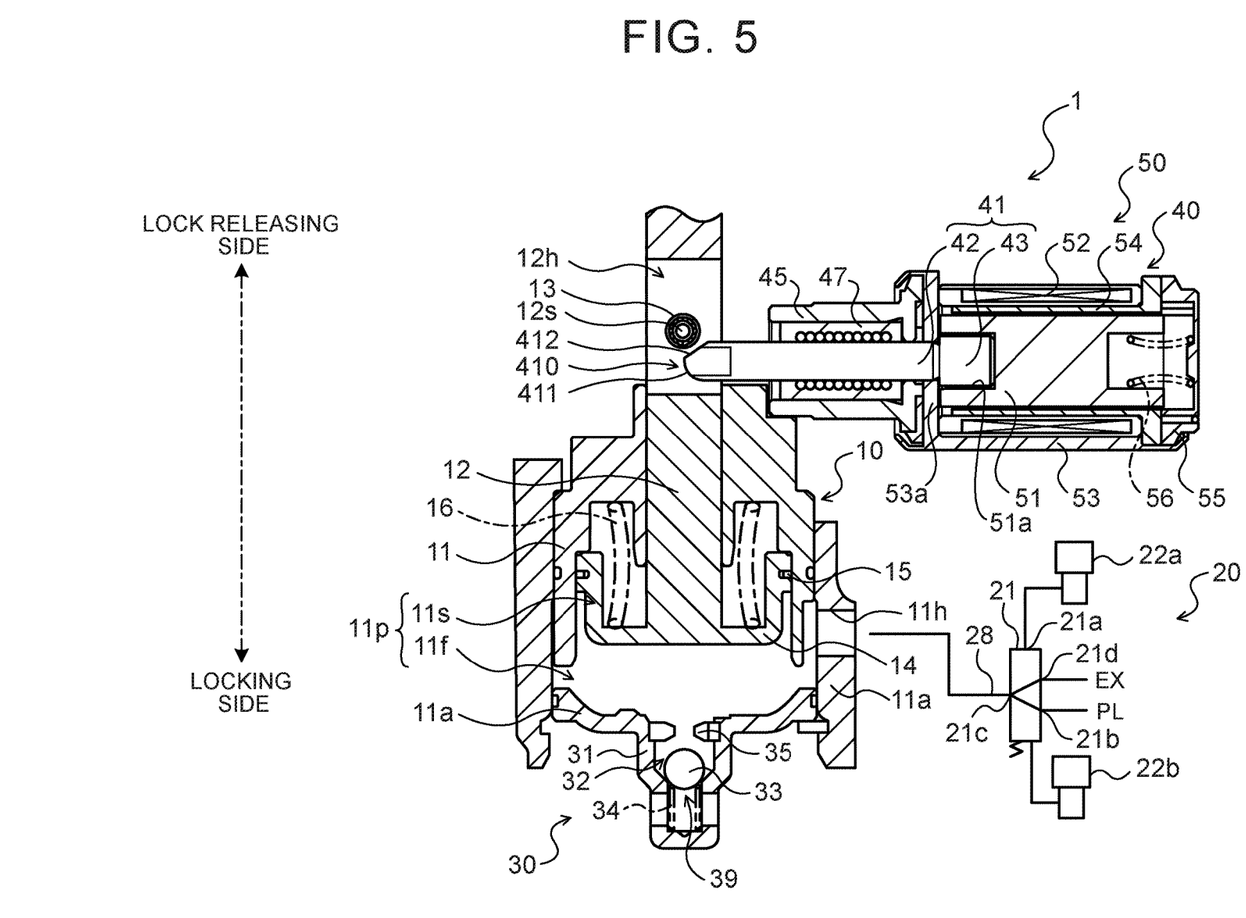
FIG. 5 is an explanatory diagram for explaining another operation of the parking device 1.

To switch the parking lock state to the parking lock released state before starting to drive the vehicle (while the engine is running), the on/off solenoid valves 22a and 22b of the hydraulic control device 20 output the signal pressures, so that the switching valve 21 establishes the first state, in which the line pressure PL is supplied from the switching valve 21 to the oil chamber 11f of the hydraulic actuator 10. When the line pressure PL is supplied to the oil chamber 11f, the hydraulic pressure of the oil chamber 11f moves the ball 33 downward in FIG. 4 to block the discharge port 39 as shown in FIG. 4, and thus the drain check valve 30 closes. The piston rod 12 and the piston 14 are moved toward the lock releasing side (upward in FIG. 4) by the hydraulic pressure in the oil chamber 11f against the urging force of the return spring 16, and stop in a position for forming a second predetermined gap between the roller 13 and the second abutting surface 412 of the lock shaft 41, as shown in FIG. 5. The parking lock released state is established in the above-described manner. When the piston rod 12 moves toward the lock releasing side, the lock shaft 41 and the plunger 51 are moved toward the rear cap 55 (rightward in FIG. 4) by a force applied from the roller 13 to the first abutting surface 411 of the lock shaft 41 caused by contact between the roller 13 and the first abutting surface 411. When the roller 13 stops contacting the first abutting surface 411, the lock shaft 41 and the plunger 51 are moved toward the piston rod 12 (leftward in FIG. 5) by the urging force of the spring 56.

Figure 6:
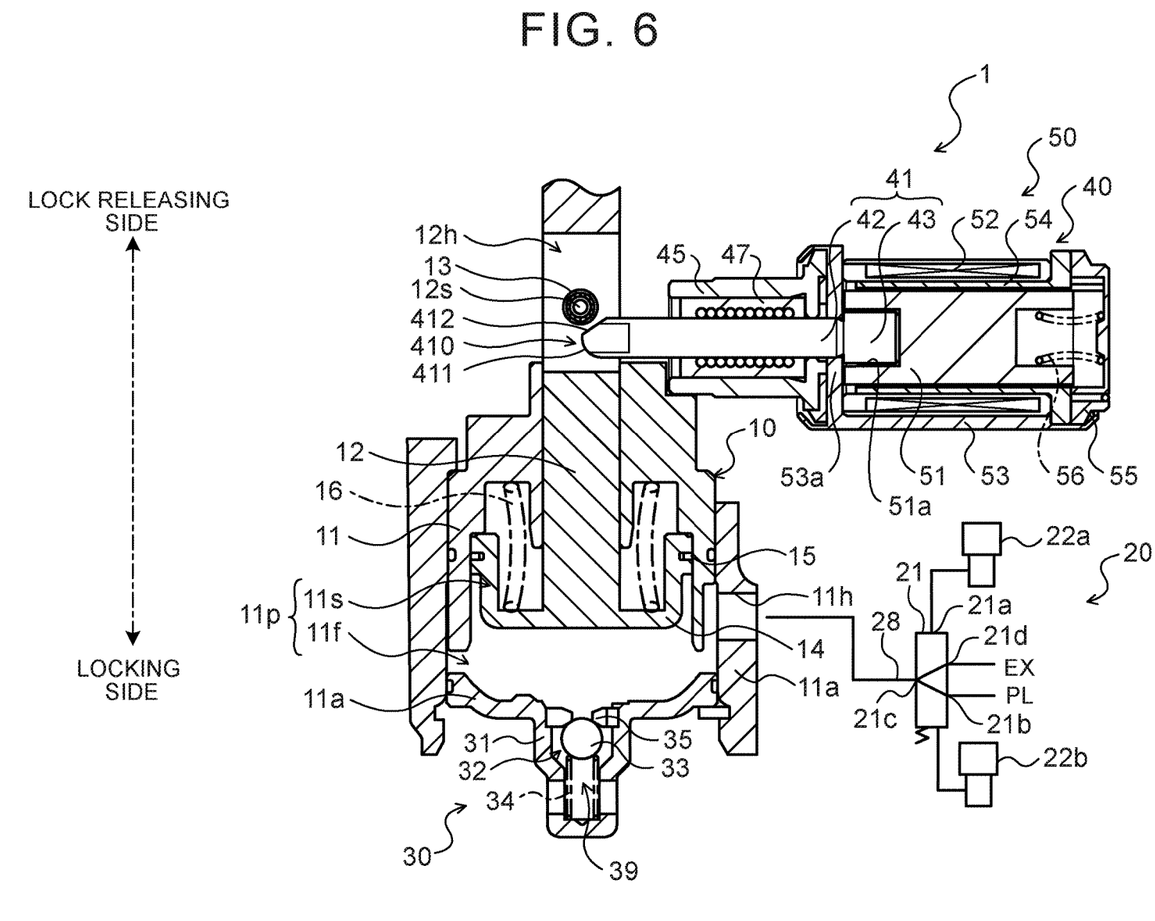
FIG. 6 is an explanatory diagram for explaining still another operation of the parking device 1.

The following describes an operation to perform switching from the parking lock released state shown in FIG. 5 to the parking lock state shown in FIG. 1. When the parking lock released state is switched to the parking lock state, the on/off solenoid valves 22a and 22b of the hydraulic control device 20 stops outputting the signal pressures so that the switching valve 21 establishes the second state, in which the line pressure PL stops being supplied from the switching valve 21 to the oil chamber 11f of the hydraulic actuator 10, and the hydraulic oil in the oil chamber 11f and the oil passage 28 starts to be discharged from the drain port 21d of the switching valve 21 through the oil hole 11h and the oil passage 28. When the hydraulic pressure of the oil chamber 11f drops to reach below the predetermined pressure Pref described above, the ball 33 moves upward in FIG. 6 to release the shielding of the discharge port 39, and thus the drain check valve 30 opens, as shown FIG. 6. This operation discharges the hydraulic oil in the oil chamber 11f from the drain port 21d of the switching valve 21 through the oil hole 11h and the oil passage 28, and, in addition, discharges the hydraulic oil from the discharge port 39 through the drain check valve 30. The piston rod 12 and the piston 14 is moved by the urging force of the return spring 16 toward the locking side (downward in FIG. 6), and stop in a position for forming the first predetermined gap between the roller 13 and the first abutting surface 411 of the lock shaft 41, as shown in FIG. 1. The parking lock state is established in the above-described manner. In the embodiment, the distance between the oil chamber 11f and the discharge port 39 is smaller than the length of the oil passage 28 between the oil chamber 11f and the switching valve 21; the oil hole 11h is formed in the side wall 11a of the case 11; and the drain check valve 30 (discharge port 39) is provided at the bottom 11b of the case 11 (on the locking side of the piston 14). These features cause the hydraulic oil in the oil chamber 11f to be discharged mainly from the discharge port 39 through the drain check valve 30. When the piston rod 12 moves toward the locking side, the lock shaft 41 and the plunger 51 are moved toward the rear cap 55 (rightward in FIG. 6) by a force applied from the roller 13 to the second abutting surface 412 of the lock shaft 41 caused by contact between the roller 13 and the second abutting surface 412. When the roller 13 stops contacting the second abutting surface 412, the lock shaft 41 and the plunger 51 are moved toward the piston rod 12 (leftward in FIG. 5) by the urging force of the spring 56.

In this manner, in the embodiment, when the line pressure PL stops being supplied from the switching valve 21 to the oil chamber 11f of the hydraulic actuator 10 and the hydraulic pressure of the oil chamber 11f starts to drop in the parking lock released state, the drain check valve 30 (valve that is placed closer to the oil chamber 11f than the switching valve 21 is) that includes the accommodating portion 31 integrally formed with the bottom 11b of the case 11 is opened. Thus, the parking device 1 of the embodiment can discharge the hydraulic oil in the oil chamber 11f more quickly than a parking device that discharges the hydraulic oil in the oil chamber 11f only from the drain port 21d of the switching valve 21 through the oil hole 11h and the oil passage 28. As a result, the piston rod 12 can be more quickly moved toward the locking side, so that the parking lock state can be more quickly established. In the embodiment, the spring constant of the spring 34 and the like are determined such that the drain check valve 30 closes (keeps closing) when the oil chamber 11f is supplied with a hydraulic pressure equal to or higher than a predetermined hydraulic pressure that is slightly lower than a holding hydraulic pressure required to keep the piston rod 12 and the piston 14 in the parking lock released state.

The following describes an operation to keep the parking lock released state shown in FIG. 5. While the line pressure PL is supplied from the switching valve 21 of the hydraulic control device 20 to the oil chamber 11f of the hydraulic actuator 10 after the parking lock state has been switched to the parking lock released state, the supplied hydraulic pressure can keep the parking lock released state. However, for example, when the engine is stopped by execution of an idling stop operation, the line pressure PL stops being supplied from the switching valve 21 to the oil chamber 11f. Then, as described above, the hydraulic oil in the oil chamber 11f is discharged from the discharge port 39 through the drain check valve 30 and also discharged from the drain port 21d of the switching valve 21 through the oil hole 11h and the oil passage 28, so that the return spring 16 may move the piston rod 12 and the piston 14 toward the locking side (downward in FIG. 5) so as to switch the state to the parking lock state. For this reason, in the embodiment, when, for example, conditions for stopping idling are satisfied, the coil 52 of the electromagnetic locking device 40 starts to be energized to attract the plunger 51 toward the flange 53a of the yoke 53 so as to restrain the lock shaft 41 and the plunger 51 from moving toward the rear cap 55 (rightward in FIG. 5). By this operation, the piston rod 12 starts moving toward the locking side and when the roller 13 comes in contact with the second abutting surface 412 of the lock shaft 41, the piston rod 12 can be held at that position. As a result, the parking lock released state can be maintained even when the hydraulic pressure of the oil chamber 11f is reduced by the idling stop operation after the parking lock released state has been established by the hydraulic pressure supplied to the oil chamber 11f.

The parking device 1 of the embodiment described above is provided with the switching valve 21 that supplies the line pressure PL to the oil chamber 11f defined by the case 11 and the piston 14, and is also provided, in the case 11, with the drain check valve 30 that closes (prohibits the hydraulic oil in the oil chamber 11f from being discharged) when the line pressure PL is supplied to the oil chamber 11f, and opens (allows the hydraulic oil in the oil chamber 11f to be discharged) when the line pressure PL is not supplied to the oil chamber 11f. With this structure, when the line pressure PL stops being supplied from the switching valve 21 to the oil chamber 11f of the hydraulic actuator 10 in the parking lock released state, the hydraulic oil can be more quickly discharged than in the case of a parking device that discharges the hydraulic oil in the oil chamber 11f only from the drain port 21d of the switching valve 21 through the oil hole 11h and the oil passage 28. As a result, the piston rod 12 can be more quickly moved toward the locking side, so that the parking lock state can be more quickly established.

The parking device 1 of the embodiment is provided with the electromagnetic locking device 40 that restrains, when the coil 52 is energized, the lock shaft 41 and the plunger 51 from moving in the direction of moving away from the piston rod 12, thereby restraining the movement of the piston rod 12 by the contact between the roller 13 provided in the piston rod 12 and the abutting portion 410 (the first and second abutting surfaces 411 and 412) of the lock shaft 41. This structure can maintain the parking lock released state even when the hydraulic pressure of the oil chamber 11*f* is reduced by the idling stop operation after the parking lock released state has been established by the hydraulic pressure supplied to the oil chamber 11*f*.

As is clear from the above description, in the parking device 1 of the embodiment, the hydraulic actuator 10 and the electromagnetic locking device 40 are arranged such that the axial direction of the piston rod 12 is orthogonal to the axial direction of the lock shaft 41 and the plunger 51. This structure allows the parking device 1 to be more easily placed in a limited space inside or outside the transmission case than a structure in which the hydraulic actuator 10 and the electromagnetic locking device 40 are coaxially arranged.

In the parking device 1 of the embodiment, the bottom 11*b* of the case 11 and the accommodating portion 31 of the drain check valve 30 are integrally formed with each other. However, the bottom 11*b* and the accommodating portion 31 may be separately formed from each other. In this case, the oil chamber 11*f* may communicate with the accommodating space 32 of the accommodating portion 31 of the drain check valve 30 through an oil passage shorter than the oil passage 28 between the oil chamber 11*f* and the switching valve 21.

Figure 7:
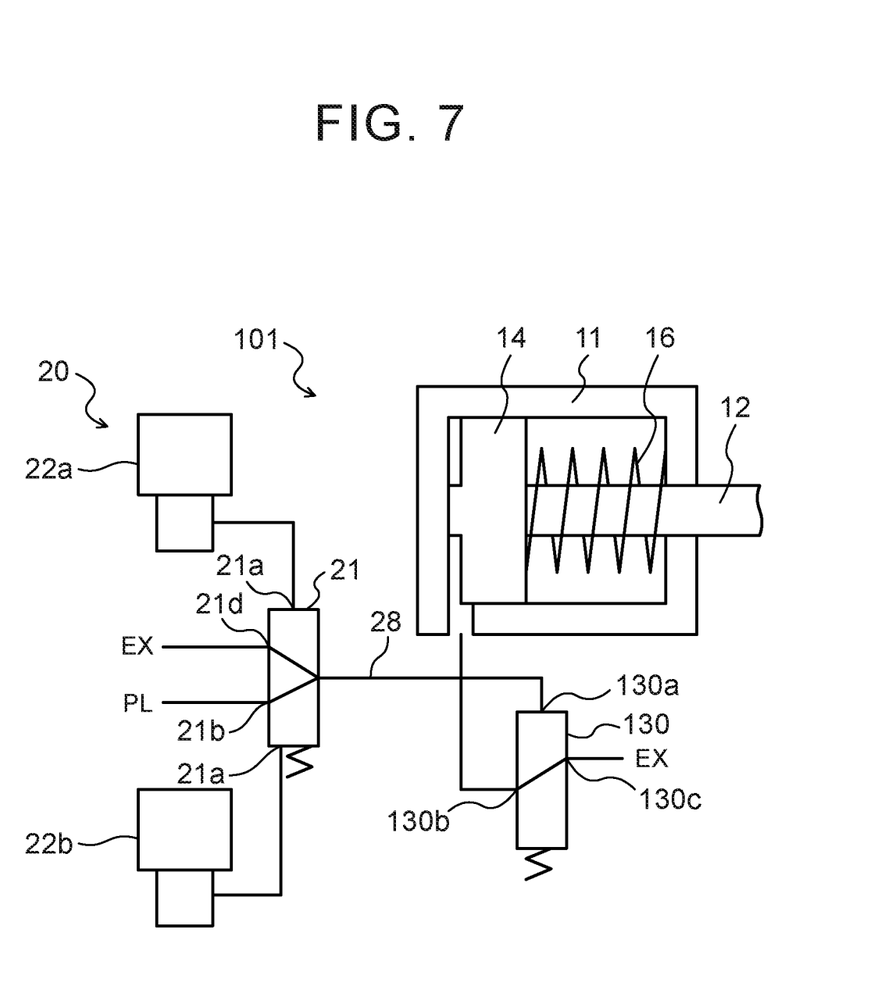
FIG. 7 is a schematic diagram schematically showing a main part of a parking device 101 of a modification of the present disclosure i.

In the parking device 1 of the embodiment, the drain check valve 30 includes the accommodating portion 31, the ball 33, and the spring 34. However, as shown in a schematic diagram of FIG. 7 illustrating a main part of a parking device 101 of a modification of the present disclosure, a drain check valve 130 may be structured as a spool valve that is placed closer to the oil chamber 11*f* than the switching valve 21 is in the oil passage 28, and that includes a sleeve in which various ports such as a signal pressure input port 130*a* for receiving the line pressure PL, an input port 130*b*, and a drain port 130*c* are formed, a spool that slides in the sleeve in the axial direction thereof, and a spring that urges the spool toward one side in the axial direction thereof. When the line pressure PL is supplied to the signal pressure input port 130*a*, the spool of the drain check valve 130 moves toward the other side in the axial direction thereof against the urging force of the spring, and thereby blocking communication between the input port 130*b* and the drain port 130*c*. When the line pressure PL is not supplied through the signal pressure input port 130*a*, the urging force of the spring urges the spool toward one side in the axial direction thereof, and thereby providing communication between the input port 130*b* and the drain port 130*c*. In this case, in the same manner as in the embodiment, when the line pressure PL stops being supplied from the switching valve 21 to the oil chamber 11*f* of the hydraulic actuator 10 in the parking lock released state, the hydraulic oil can be more quickly discharged, the piston rod 12 can be more quickly moved toward the locking side, and the parking lock state can be more quickly established than in the case of a parking device that discharges the hydraulic oil in the oil chamber 11*f* only from the drain port 21*d* of the switching valve 21 through the oil hole 11*h* and the oil passage 28.

In the parking device 1 of the embodiment, when the parking lock released state is switched to the parking lock state, the piston rod 12 is moved by the urging force of the return spring 16 toward the locking side while moving the lock shaft 41 and the plunger 51 toward the rear cap 55. At this time, a hydraulic pressure (hydraulic oil) may be supplied to the spring chamber 11*s* of the hydraulic actuator 10 from the hydraulic control device 20. This operation can more quickly move the piston rod 12 toward the locking side.

In the parking device 1 of the embodiment, the piston rod 12 is urged by the elastic force of the return spring 16 toward the locking side (downward in FIG. 1), and is moved by the hydraulic pressure against the elastic force of the return spring 16 toward the lock releasing side (upward in FIG. 1). However, conversely, the piston rod 12 may be urged by an elastic force of a return spring toward the lock releasing side, and moved by a hydraulic pressure against the elastic force of the return spring toward the locking side.

In the parking device 1 of the embodiment, the lock shaft 41 and the plunger 51 are structured as separate bodies. However, the lock shaft 41 and the plunger 51 may be integrally formed with each other.

In the parking device 1 of the embodiment, the electromagnetic locking device 40 allows the lock shaft 41 and the plunger 51 to move toward the rear cap 55 (rightward in FIG. 1) (allows the piston rod 12 to move toward the locking side and the lock releasing side [upward and downward in FIG. 1]) when the coil 52 is not energized, and attracts the plunger 51 toward the flange 53*a* of the yoke 53 (in FIG. 1) so as to restrain the lock shaft 41 and the plunger 51 from moving toward the rear cap 55 when the coil 52 is energized. However, a portion on the flange 53*a* side (on the left end side in FIG. 1) of the plunger 51 may be constituted by a permanent magnet so that an attraction between the flange 53*a* and the permanent magnet is used to restrain the lock shaft 41 and the plunger 51 from moving toward the rear cap 55 when the coil 52 is not energized, and the attraction between the flange 53*a* and the permanent magnet is canceled to allow the lock shaft 41 and the plunger 51 to move toward the rear cap 55 when the coil 52 is energized.

In the parking device 1 of the embodiment, the electromagnetic locking device 40 restrains the movement of the piston rod 12 by using the lock shaft 41 that is movable in the direction (the right-left direction in FIG. 1) orthogonal to the axial direction of the piston rod 12 (the up-down direction in FIG. 1). However, a shaft member movable in the same direction as the axial direction of the piston rod 12 may be used to restrain the movement of the piston rod 12.

A parking device of the present disclosure will be described below.

The parking device of the present disclosure is a parking device that is mounted on a vehicle and establishes a parking lock state and a parking lock released state, and includes a movable member that reciprocates in a first direction so as to be capable of performing switching between the parking lock state and the parking lock released state; an elastic member that exerts an elastic force to urge the movable member toward one side of the first direction; a housing that accommodates the movable member and forms a hydraulic oil chamber in cooperation with the movable member; a switching valve that performs switching between supply of hydraulic oil to the hydraulic oil chamber and discharge of the hydraulic oil from the hydraulic oil chamber; and a discharge valve that is separately structured from the switching valve, and that prohibits the hydraulic oil from being discharged from the hydraulic oil chamber when the hydraulic oil is supplied from the switching valve to the hydraulic oil chamber, and allows the hydraulic oil to be discharged from the hydraulic oil chamber when the hydraulic oil is not supplied from the switching valve to the hydraulic oil chamber. According to an exemplary embodiment of The parking device, the hydraulic oil is discharged from the hydraulic oil chamber through the switching valve and the discharge valve.

The parking device of the present disclosure includes the switching valve that performs the switching between supply of the hydraulic oil to the hydraulic oil chamber and discharge of the hydraulic oil from the hydraulic oil chamber. The parking device also includes the discharge valve that is separately structured from the switching valve, and that prohibits the hydraulic oil from being discharged from the hydraulic oil chamber when the hydraulic oil is supplied from the switching valve to the hydraulic oil chamber, and allows the hydraulic oil to be discharged from the hydraulic oil chamber when the hydraulic oil is not supplied from the switching valve to the hydraulic oil chamber. The hydraulic oil is discharged from the hydraulic oil chamber through the switching valve and the discharge valve. This structure can reduce time required to discharge the hydraulic oil from the hydraulic oil chamber, and thus can more quickly move the movable member toward one side of the first direction. As a result, the state of parking device can be more quickly switched to a state established on one side of the first direction between the parking lock state and the parking lock released state.

The parking device of the present disclosure described above may further include a pressure regulating valve that regulates a pressure of the hydraulic oil to generate a line pressure, and the discharge valve may be opened when the pressure of the hydraulic oil in the hydraulic oil chamber is lower than a predetermined pressure that is equal to or lower than a lower limit value of the generated line pressure. In this case, when the hydraulic oil (line pressure) is supplied to the hydraulic oil chamber, the discharge valve closes, so that the hydraulic oil can be restrained from being discharged from the discharge valve.

In the parking device of the present disclosure, the discharge valve may include an accommodating portion having an accommodating space communicating with the hydraulic oil chamber and a discharge port, a valve element that is placed in the accommodating space and is capable of shielding the discharge port with the pressure of the hydraulic oil chamber, and an urging member that urges the valve element so as not to shield the discharge port. The discharge valve may be opened when a force for opening the valve determined by a sealing area of the discharge port provided by the valve element and an elastic force of the urging member is larger than a force for closing the valve determined by a cross-sectional area of the movable member and the elastic force of the elastic member.

In the parking device of the present disclosure, the discharge valve may include an accommodating portion having an accommodating space communicating with the hydraulic oil chamber and a discharge port, a valve element that is placed in the accommodating space and is capable of shielding the discharge port with the pressure of the hydraulic oil chamber, and an urging member that urges the valve element so as not to shield the discharge port. The discharge valve may be opened when the urging member extends and closes when the urging member contracts. In this case, when the hydraulic pressure is supplied from the switching valve to the hydraulic oil chamber, the hydraulic pressure contracts the urging member, and the valve element shields the discharge port to close the discharge valve, so that the hydraulic oil can be prohibited from being discharged from the hydraulic oil chamber. When the hydraulic oil is not supplied from the switching valve to the hydraulic oil chamber, the urging member urges the valve element so as not to shield the discharge port, and the urging member extends to release the shielding of the discharge port by the valve element to open the discharge valve. Thus, the hydraulic oil can be allowed to be discharged from the hydraulic oil chamber. Here, as the valve element, a ball can be used, for example.

In the parking device according to this aspect of the present disclosure in which the discharge valve includes the accommodating portion, the valve element, and the urging member, the valve element may be a ball; the discharge valve may further include a receiving part that receives the ball with a plurality of claws; and the receiving part may allow the hydraulic oil to flow between the hydraulic oil chamber and the discharge port when the ball is received. This structure allows the hydraulic oil in the hydraulic oil chamber to be discharged from the discharge port when the urging member extends.

In the parking device according to this aspect of the present disclosure in which the discharge valve includes the accommodating portion, the valve element, and the urging member, the accommodating portion may be placed at an end of the housing on a side opposite to the movable member, and a port communicating with the switching valve may be placed in a side wall of the housing. This structure allows the distance between the hydraulic oil chamber and the discharge port to be sufficiently smaller than the distance (length of the oil passage) between the switching valve and the hydraulic oil chamber, and thus allows the hydraulic oil to be more quickly discharged when the discharge valve allows the hydraulic oil in the hydraulic oil chamber to be discharged.

In the parking device of the present disclosure, the switching valve may be structured as a switching valve that performs switching between a first state of supplying the line pressure to the hydraulic oil chamber through a predetermined oil passage, and a second state of draining the hydraulic oil in the hydraulic oil chamber and the predetermined oil passage.

The parking device of the present disclosure may further include a magnetic locking device that includes a second movable member including an abutting portion capable of abutting on an abutment target provided at the movable member and being movable in a direction (second direction) orthogonal to the first direction, and that is capable of locking the second movable member with a magnetic force such that contact between the abutment target and the abutting portion restrains the movable member from moving. With this structure, after the hydraulic pressure supplied from the switching valve to the hydraulic oil chamber has moved the movable member toward the other side of the first direction to establish the parking lock state or the parking lock released state, when the hydraulic pressure of the hydraulic oil chamber drops and the elastic force of the elastic member is ready to move the movable member toward one side of the first direction, the magnetic force can be used to restrain the movable member from moving toward one side of the first direction by the contact between the abutment target of the movable member and the abutting portion of the second movable member. As a result, even when the hydraulic pressure of the hydraulic oil chamber drops, the state before the drop in the hydraulic pressure (the parking lock state or the parking lock released state) can be maintained.

In the parking device according to this aspect of the present disclosure further including the magnetic locking device, the magnetic locking device may further include, in addition to the second movable member, a second urging member for urging the second movable member toward the movable member and a solenoid unit that locks the second movable member as a coil is energized such that the second movable member does not move away from the movable member.

The following describes correspondence relations between main elements of the embodiment and main elements of the disclosure described in the summary of the disclosure. In the embodiment, the piston rod 12 and the piston 14 correspond to a "movable member", and the return spring 16 corresponds to an "elastic member", the case 11 corresponds to a "housing", the switching valve 21 corresponds to a "switching valve", and the drain check valve 30 corresponds to a "discharge valve".

While the modes for carrying out the present disclosure have been described above using the exemplary embodiment, the present disclosure is not particularly limited to the embodiment, but can naturally be carried out in various forms as those skilled in the art will readily recognize.

INDUSTRIAL APPLICABILITY

The present disclosure can be used, for example, in the manufacturing industry of parking devices.

The invention claimed is:

1. A parking device that is mounted on a vehicle and establishes a parking lock state and a parking lock released state, the parking device comprising:
   a movable member that reciprocates in a first direction so as to be capable of performing switching between the parking lock state and the parking lock released state;
   an elastic member that exerts an elastic force to urge the movable member toward one side of the first direction;
   a housing that accommodates the movable member and forms a hydraulic oil chamber in cooperation with the movable member;
   a switching valve that performs switching between supply of hydraulic oil to the hydraulic oil chamber and discharge of the hydraulic oil from the hydraulic oil chamber; and
   a discharge valve that is separately structured from the switching valve, and that prohibits the hydraulic oil from being discharged from the hydraulic oil chamber when the hydraulic oil is supplied from the switching valve to the hydraulic oil chamber, and allows the hydraulic oil to be discharged from the hydraulic oil chamber when the hydraulic oil is not supplied from the switching valve to the hydraulic oil chamber, wherein
   the hydraulic oil is discharged from the hydraulic oil chamber through the switching valve and the discharge valve;
   the discharge valve includes an accommodating portion having an accommodating space communicating with the hydraulic oil chamber and a discharge port, a valve element that is placed in the accommodating space and is capable of shielding the discharge port with the hydraulic pressure of the hydraulic oil chamber, and an urging member that urges the valve element so as not to shield the discharge port, and the discharge valve opens when the urging member extends and closes when the urging member contracts;
   the valve element is a ball;
   the discharge valve further includes a receiving part that receives the ball with a plurality of claws; and
   the receiving part allows the hydraulic oil to flow between the hydraulic oil chamber and the discharge port when the ball is received.

2. The parking device according to claim 1, further comprising a pressure regulating valve that regulates a pressure of the hydraulic oil to generate a line pressure, wherein
   the discharge valve opens when the pressure of the hydraulic oil in the hydraulic oil chamber is lower than a predetermined pressure that is equal to or lower than a lower limit value of the generated line pressure.

3. The parking device according to claim 1, wherein
   the accommodating portion is placed at an end of the housing on a side opposite to the movable member; and
   a port communicating with the switching valve is placed in a side wall of the housing.

4. The parking device according to claim 3, wherein
   the switching valve is structured as a switching valve that performs switching between a first state of supplying the line pressure to the hydraulic oil chamber through a predetermined oil passage, and a second state of draining the hydraulic oil in the hydraulic oil chamber and the predetermined oil passage.

5. The parking device according to claim 4, further comprising:
   a magnetic locking device that includes a second movable member including an abutting portion capable of abutting on an abutment target provided at the movable member and movable in a direction orthogonal to the first direction, and that is capable of locking the second movable member with a magnetic force such that contact between the abutment target and the abutting portion restrains the movable member from moving.

6. The parking device according to claim 1, wherein
   the discharge valve includes an accommodating portion having an accommodating space communicating with the hydraulic oil chamber and a discharge port, a valve element that is placed in the accommodating space and is capable of shielding the discharge port with the hydraulic pressure of the hydraulic oil chamber, and an urging member that urges the valve element so as not to shield the discharge port; and
   the discharge valve opens when a force for opening the valve determined by a sealing area of the discharge port provided by the valve element and an elastic force of the urging member is larger than a force for closing the valve determined by a cross-sectional area of the movable member and the elastic force of the elastic member.

7. The parking device according to claim 1, wherein
   the accommodating portion is placed at an end of the housing on a side opposite to the movable member; and
   a port communicating with the switching valve is placed in a side wall of the housing.

8. The parking device according to claim 7, wherein
   the switching valve is structured as a switching valve that performs switching between a first state of supplying the line pressure to the hydraulic oil chamber through a predetermined oil passage, and a second state of draining the hydraulic oil in the hydraulic oil chamber and the predetermined oil passage.

9. The parking device according to claim 8, further comprising:
a magnetic locking device that includes a second movable member including an abutting portion capable of abutting on an abutment target provided at the movable member and movable in a direction orthogonal to the first direction, and that is capable of locking the second movable member with a magnetic force such that contact between the abutment target and the abutting portion restrains the movable member from moving.

10. The parking device according to claim 1, wherein the discharge valve includes an accommodating portion having an accommodating space communicating with the hydraulic oil chamber and a discharge port, a valve element that is placed in the accommodating space and is capable of shielding the discharge port with the hydraulic pressure of the hydraulic oil chamber, and an urging member that urges the valve element so as not to shield the discharge port, and the discharge valve opens when the urging member extends and closes when the urging member contracts.

11. The parking device according to claim 1, wherein the switching valve is structured as a switching valve that performs switching between a first state of supplying the line pressure to the hydraulic oil chamber through a predetermined oil passage, and a second state of draining the hydraulic oil in the hydraulic oil chamber and the predetermined oil passage.

12. The parking device according to claim 1, further comprising:
a magnetic locking device that includes a second movable member including an abutting portion capable of abutting on an abutment target provided at the movable member and movable in a direction orthogonal to the first direction, and that is capable of locking the second movable member with a magnetic force such that contact between the abutment target and the abutting portion restrains the movable member from moving.

* * * * *